March 17, 1970     S. E. McCREA     3,501,190
BUMPER FORMING A RESERVOIR WITH FOLDABLE STEP
Filed June 3, 1968
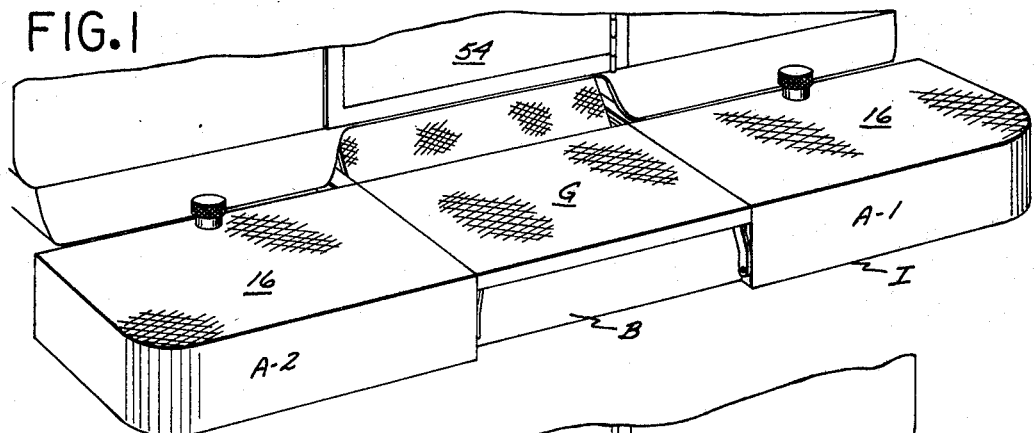
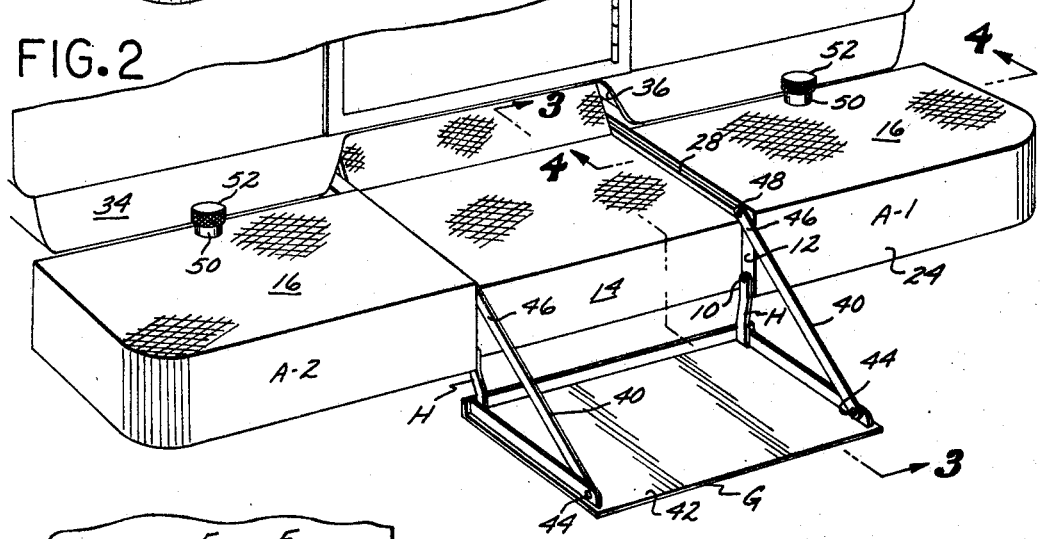
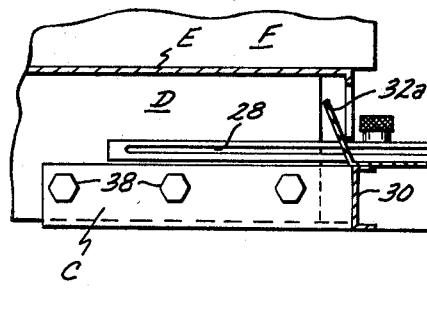
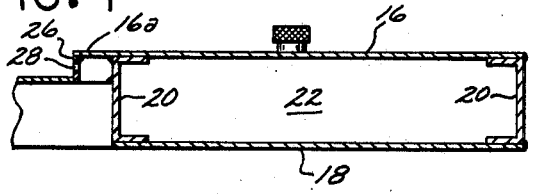
INVENTOR.
SAM E. McCREA
BY
William G. Babcock
ATTORNEY

United States Patent Office 3,501,190
Patented Mar. 17, 1970

3,501,190
BUMPER FORMING A RESERVOIR WITH FOLDABLE STEP
Samuel E. McCrea, Compton, Calif., assignor of one-fourth to Mattie E. Handy, Bellflower, Calif.
Filed June 3, 1968, Ser. No. 734,047
Int. Cl. B60r 3/02, 19/04
U.S. Cl. 293—69                                    8 Claims

ABSTRACT OF THE DISCLOSURE

A bumper, auxiliary fluid reservoir and step combination that may be removably mounted on the rear of a truck camper to protect the same, facilitate ease of entry into the camper as well as exit therefrom, and also provides storage facilities for a fluid such as fuel, water, or the like.

BACKGROUND OF THE INVENTION

Field of the invention

A bumper, auxiliary fluid reservoir and step formed as an integral unit for removably mounting on the rear of a truck camper.

Description of the prior art

When a truck camper is used on long trips in out-of-the-way locations, it is highly desirable that auxiliary reservoirs be suppliied to carry fuel. Also, on such trips it is desirable that step means be provided to facilitate the easy entry into and exit from the camper body. The rear of the camper body is preferably protected by a bumper. To carry individual auxiliary reservoirs as well as a separate step is objectionable, for these two objects occupy valuable space within the limited confines of the camper body. In the present invention the rear bumper, auxiliary reservoirs and step structures are incorporated in a single unitary structure that may be removably mounted on the rear of a vehicle to not only serve as a bumper, but supply fuel or water when needed, as well as permit entry into and exit from the camper body within a minimum of inconvenience.

SUMMARY OF THE INVENTION

A bumper, auxiliary fluid reservoirs, and step structure that are incorporated into a single unit that may be removably secured to the rear of a camper body to permit the vehicle on which it is mounted to be used more advantageously than when the bumper, auxiliary fluid reservoirs and step structures are associated with the vehicle as individual components.

A major object of the present invention is to provide a bumper, auxiliary reservoir and step combination of relatively simple mechanical structure which can be fabricated from standard, commercially available materials, requires little or no maintenance attention, and may be removably secured to the rear of a truck camper to not only protect the same from damage, but also to provide an auxiliary source of fuel or water as required and facilitate the entry into the camper body and exit therefrom.

Another object of the invention is to furnish a combined bumper, auxiliary fluid reservoir and step that may be easily and quickly mounted on a truck camper, and one that does not detract from the appearance of the vehicle on which it is mounted, but instead, enhances the ornamental appearance thereof.

BRIEF DESCRIPTION OF THE DRAWING

FIGURE 1 is a perspective view of the bumper, auxiliary reservoir and step structure transversely positioned on the rear of a truck camper;

FIGURE 2 is the same view as shown in FIGURE 1, but showing the step disposed in a position to facilitate entry into and exit from the camper body;

FIGURE 3 is a fragmentary, vertical, cross-sectional view of the invention, taken on the line 3—3 of FIGURE 2;

FIGURE 4 is a fragmentary, vertical, cross-sectional view of the combination, taken on the line 4—4 of FIGURE 2; and FIGURE 5 is a fragmentary, side-elevational view of the invention illustrating an alternate form of removably supporting the same from the chassis of a truck body.

DESCRIPTION OF THE PREFERRED EMBODIMENT

The invention I may best be seen in FIGURES 1 and 2 and includes enclosed two elongate, fluid reservoirs A-1 and A-2 that are coaxially aligned and in spaced relationship. A connector B extends between the adjacent ends of the fluid reservoirs A-1 and A-2 (FIGURE 1) and maintains them in the desired spaced relationship. Two laterally spaced, parallel arms C extend forwardly from the reservoirs A-1 and A-2 as best seen in FIGURE 3. The arms C are adjacently disposed to two parallel, laterally spaced side pieces D of a truck chassis which supports a bed E. The bed E serves as a support for the camper body, as shown in FIGURE 3.

A first flat rectangular step G is provided (FIGURE 2) from the forward portion of which two rigid arms H project when the step is disposed in a first position as shown in FIGURE 2. Arms H are pivotally supported at their upper ends by pins 10 that project outwardly from adjacent faces 12 of the reservoirs A-1 and A-2. The arms H are so disposed relative to the connector B, that the rear face 14 thereof serves as a stop, when the first step G occupies the first position shown in FIGURE 2. Both the reservoirs A-1 and A-2 are structurally the same, and accordingly, only the details of reservoir A-1 will be described herein.

Reservoir A-1, best shown in FIGURES 2 and 4, includes a flat top 16, flat bottom 18, and two laterally spaced side members 18 that are connected on the forward ends thereof by a forward wall 22 and on their rear ends by a rear wall 24. The tops 16a extend towards one another, and are secured to the upper edges of forwardly projecting strips 24 in which longitudinally extending slots 26 are defined, as shown in FIGURE 4. The free end of extension 16a is secured to the upper edge of a longitudinally extending strip 26 in which an elongate slot 28 is defined, for purposes that will later be described.

Connector B (FIGURE 3) is preferably defined by two spaced parallel channel-shaped cross members 30 that support a flat plate 32 on the upper surface thereof. In addition to serving as a part of the connector B, the plate 32 also serves as a second step, as may be seen in FIGURE 2, when the first step G is disposed in a first, horizontal position.

On most present-day flat bed trucks the rear end of bed E develops into a downwardly extending flange 34. In some makes of flat bed trucks, the flange 34 has a centrally disposed opening 36 formed therein, as shown in FIGURE 2. In those instances, the plate 32 is sufficiently long that a forwardly disposed portion 32a thereof may be bent upwardly, as illustrated in FIGURES 2 and 3, to partially close the opening 36.

The arms C, best shown in FIGURE 3, are secured to the chassis side pieces D by bolts 38, or other conventional fastening means. A pair of elongate links 40 are connected to opposite sides of a first end portion 42 of step G by pins 44. Pins 48 extend outwardly away from one another and slidably engage the slots 28 in the forward ends 46 of links 40. The slots 28 are of such length that when the first step G is in the horizontal position (FIGURE 2), the pins 48 are in contact with the rear ends of the slots, and the rear ends act as stops to prevent further downward pivotal movement of the first step G.

In FIGURES 2 and 3 it will be seen that the first step G can swing through a predetermined arcuate path. When the legs H have been moved to disposed the first step G at the lower extremity of the arcuate path, this first step is in the horizontal position shown in FIGURE 2. After the first step G has been pivoted in a counterclockwise direction, as shown in FIGURE 3, it can be caused to overlie the connector B, with the step G then cooperating with the tops 16 of the reservoirs A-1 and A-2 to provide a substantially continuous surface, and the reservoirs, connector, and first step cooperatively define a bumper structure that protects the rear of the vehicle F on which it is mounted.

The reservoirs A-1 and A-2 are provided with a liquid inlet 50 at the top thereof which is removably closed by a plug or cap 52 of conventional design. Due to the fact that the reservoirs A-1 and A-2 are not connected, each reservoir may hold a different type of fluid. For instance, one reservoir may be filled with fuel and the other with water, oil or the like. Discharge of fluid from the reservoirs A-1 and A-2 is effected by conventional valve means (not shown). The camper body F, as is conventional with such equipment is provided with a door 54 in the central rear portion thereof, to permit entry into the camper body F or exit therefrom. Entry into the camper body F is simply and easily effected when the first step G is positioned as shown in FIGURE 2, whereby a person may use this step and the second step 32 to enter the confines of the camper through the door 54.

An alternate structure of the invention is shown in FIGURE 5, in which the arms C are replaced by tubes C' of circular transverse cross section. The tubes C' are slidably supported in second tubes 56 secured to the chassis side pieces D by welding or the like. The tubes C' are held in desired relationship to the second tubes 56 by bolts 58, or other fastening means, that are threaded into the second tube 56 and frictionally engage the first tube C', or in lieu thereof, engage transverse bores or dimples formed therein. If desired, the bolts 58 may be replaced by pins that are removably held in engagement with openings in the tubes C' and 56 by conventional means. The use and operation of the invention I has been previously described in detail, and need not be repeated.

Although the invention has been described as including reservoirs A-1 and A-2, the liquid holding portions thereof may be omitted, as well as the liquid inlets 50 and caps 52. When the reservoir portions are omitted the taps 16 and rear walls 24 cooperatively provide bumper-defining members. The modified device will have substantially the same appearance as the form previously described, and operate in the same manner, other than fuel or liquids which cannot be stored therein.

What is claimed is:

1. A bumper, auxiliary fluid reservoir, and step combination for use with a truck camper that includes a flat bed supported on a chassis having two parallel, longitudinally extending, laterally spaced side pieces, which combination comprises:
   (a) two coaxially aligned, rigid fluid reservoirs in longitudinal spaced relationship;
   (b) first means for holding said reservoirs in said spaced relationship;
   (c) second means connected to said truck for supporting said reservoirs and first means in a transverse position rearwardly of said chassis;
   (d) a first flat step;
   (e) third means for so pivotally supporting said first step that said step may pivot in a fixed arcuate path in a direction normal to said reservoirs;
   (f) stop means for limiting the movement of said step to a horizontal position when said step is at the lower extremity of said path, with said first step overlying said first means in a second position when said first step is at the upper extremity of said path, which step when in said second position cooperates with said reservoirs and first means to define a rear bumper on said vehicle.

2. A bumper auxiliary fluid reservoir and step combination as defined in claim 1 wherein said first means includes a flat horizontal plate that extends betwen said reservoirs and serves as a second step when said first step is in said first position.

3. A bumper, auxiliary fluid reservoir and step combination as defined in claim 1 wherein said second means further includes:
   (g) two transversely spaced arms extending forwardly from said reservoirs to positions adjacent said chassis side pieces; and
   (h) fastening means for securing said arms to said chassis side pieces.

4. A bumper, auxiliary fluid reservoir and step combination as defined in claim 1 wherein said second means further includes:
   (g) two first tubes secured to said chassis side pieces and substantially parallel thereto;
   (h) two second transversely spaced parallel tubes secured to said reservoirs and extending forwardly therefrom, which second tubes are slidably supported in said first tubes and telescopically adjustable relative thereto; and
   (i) fourth means for locking said second tubes at a desired position relative to said first tubes.

5. A bumper, auxiliary fluid reservoir and step combination as defined in claim 1 wherein said stop means further includes:
   (g) two laterally spaced elongate rigid members that extend forwardly from said reservoirs, in which members elongate longitudinally extending slots are formed;
   (h) two transversely spaced links having first and second ends;
   (i) fourth means for pivotally connecting said first ends to said first step; and
   (j) two pins that extend outwardly in opposite directions from said second ends, which pins slidably engage said slots, with said pins when in contact with the rear extremities of said slots cooperating with said links to provide stops that limit downward pivotal movement of said first step beyond a horizontal position.

6. A bumper, auxiliary fluid reservoir and step combination as defined in claim 1 wherein said third means further includes:
   (g) two rigid legs extending upwardly from opposite forward side portions of said first step when said first step is in said first position; and
   (h) fourth means for pivotally supporting said legs from said reservoirs.

7. A bumper, auxiliary fluid reservoir and step combination as defined in claim 6 wherein said stop means further includes:
   (g) a rigid member extending transversely between said reservoir, which member is contacted by said legs when said first step is in said first position.

8. A bumper and step combination for use with a truck camper body that includes a flat bed supported on a chassis having two parallel, longitudinally extending, laterally spaced side pieces, which combination comprises:
   (a) two coaxially aligned, rigid bumper-defining units in longitudinal spaced relationship;
   (b) first means for holding said units in said spaced relationship;

(c) second means connected to said truck for supporting said units and first means in a transverse position rearwardly of said chassis;
(d) a first flat step;
(e) third means for so pivotally supporting said first step that said step may pivot in a fixed arcuate path in a direction normal to said units; and
(f) stop means for limiting the movement of said step to a horizontal position when said step is at the lower extremity of said path, with said first step overlying said first means in a second position when said first step is at the upper extremity of said path, which step when in said second position cooperates with said bumper-defining units and first means to provide a rear bumper on said vehicle.

References Cited

UNITED STATES PATENTS

| | | | |
|---|---|---|---|
| 1,749,112 | 3/1930 | Russell | 293—69 |
| 2,009,189 | 7/1935 | Ash | 126—25 |
| 2,660,454 | 11/1953 | Coumerilh | 293—69 X |
| 2,993,721 | 7/1961 | Bowman | 293—69 |
| 3,318,617 | 5/1967 | Burns | 293—69 X |

ARTHUR L. LA POINT, Primary Examiner

H. BELTRAN, Assistant Examiner

U.S. Cl. X.R.

224—42.03; 280—150